US006054244A

United States Patent [19]

Kato et al.

[11] Patent Number: 6,054,244

[45] Date of Patent: Apr. 25, 2000

[54] PROCESS FOR PRODUCING TONER

[75] Inventors: Kazunori Kato, Mitaka; Toshiyuki Ugai; Satoshi Yasuda, both of Toride, all of Japan

[73] Assignee: Canon Kabushiki Kaisha, Tokyo, Japan

[21] Appl. No.: 09/219,750

[22] Filed: Dec. 23, 1998

[30] Foreign Application Priority Data

| | | | |
|---|---|---|---|
| Dec. 26, 1997 | [JP] | Japan | 9-358946 |
| Jul. 3, 1998 | [JP] | Japan | 10-188425 |

[51] Int. Cl.$^7$ .......... G03G 9/087; C08L 67/00

[52] U.S. Cl. .......... 430/137; 430/109; 430/111; 523/501; 523/505; 523/506

[58] Field of Search .......... 430/109, 111, 430/137; 523/501, 505, 506

[56] References Cited

U.S. PATENT DOCUMENTS

| | | | |
|---|---|---|---|
| 2,297,691 | 10/1942 | Carlson | 95/5 |
| 5,989,770 | 11/1999 | Ugai et al. | 430/137 |

FOREIGN PATENT DOCUMENTS

| | | | |
|---|---|---|---|
| 0524016 | 1/1993 | European Pat. Off. | G03G 9/08 |
| 0730205 | 9/1996 | European Pat. Off. | G03G 9/087 |
| 0745906 | 12/1996 | European Pat. Off. | G03G 9/087 |
| 10231 | 7/1961 | Japan . | |
| 41649 | 3/1982 | Japan | G03G 9/08 |
| 42052 | 3/1982 | Japan | G03G 9/08 |
| 55643 | 3/1989 | Japan | C08F 2/18 |
| 07649 | 4/1991 | Japan | G03G 9/087 |
| 073101 | 3/1994 | Japan | C08B 30/00 |
| 049586 | 2/1995 | Japan | G03G 9/087 |
| 301949 | 11/1995 | Japan | G03G 9/087 |
| 054457 | 2/1997 | Japan . | |

*Primary Examiner*—Bernard Codd
*Attorney, Agent, or Firm*—Fitzpatrick, Cella, Harper & Scinto

[57] ABSTRACT

A process for producing a toner comprises the steps of: adjusting to 4.0 to 6.0 the pH of an aqueous medium containing a calcium phosphates obtained by mixing an aqueous phosphate solution with an aqueous calcium salt solution; dispersing in the aqueous medium a polymerizable monomer composition having at least a polymerizable monomer, a colorant, a polar polymer or polar copolymer having a carboxyl group, and a polymerization initiator to form particles of the polymerizable monomer composition; in the aqueous medium, polymerizing the polymerizable monomer contained in the particles to form toner particles; and adjusting the pH of the aqueous medium to 1.0 to 3.0 to dissolve the calcium phosphate, followed by separating the toner particles from the aqueous medium. The circularity of the toner obtained is not less than 0.970 and less than 1.000 as measured with a flow-type particle image analyzer (FIPA).

19 Claims, 1 Drawing Sheet

FIGURE
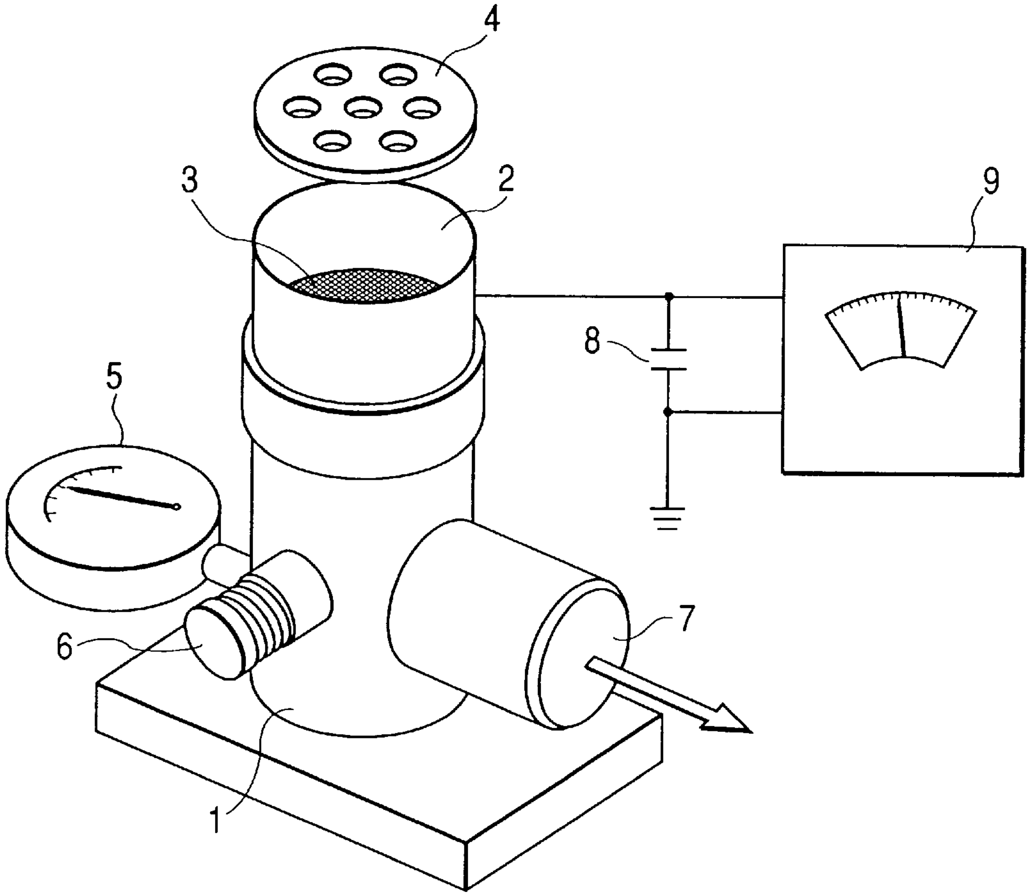

PROCESS FOR PRODUCING TONER

BACKGROUND OF THE INVENTION

1. Field of the invention

This invention relates to a process for producing a toner used in electrophotography, electrostatic recording, electrostatic printing or toner-jet recording.

b 2. Related Background Art

A number of methods as disclosed in U.S. Pat. No. 2,297,691, etc. are known as electrophotography, which is commonly a process in which, using a photoconductive material, copies are obtained by forming an electrostatic latent image on a photosensitive member by various means, subsequently developing the electrostatic latent image by the use of a toner to form a toner image, transferring the toner image to a recording medium such as paper as the occasion arises, and thereafter fixing the toner image by the action of heat, pressure or solvent vapor. As methods for developing the electrostatic image by the use of toners or methods for fixing the toner image, a variety of methods have been proposed, and methods suited for the respective image forming processes are employed.

In recent years, higher-speed copying, higher image quality and color image formation are required for the electrophotography.

Toners are commonly produced by melt-kneading colorants such as dyes and pigments into thermoplastic resins to effect uniform dispersion, followed by pulverization and classification using a fine grinding mill and a classifier, respectively, to produce toners having the desired particle diameters. This is a process known as a pulverization process.

Reasonably good toners can be produced by such a production process (pulverization process), but there is a limit to the range in which toner materials are selected. For example, colorant-dispersed resin materials must be brittle enough to be pulverizable with ease by means of an economically usable production apparatus. Since the colorant-dispersed resin materials must be made brittle to meet such a requirement, a group of particles having a broad particle size distribution tends to be formed when such a dispersion is actually pulverized at a high speed, especially causing a problem that fine particles having been pulverized excessively are included in this group of particles in a relatively large proportion. Moreover, such highly brittle materials tend to be further finely pulverized or powdered when used actually for the development in copying machines or the like.

Moreover, in toners produced by such pulverization, there are restrictions when release agents such as wax are added. More specifically, in order to disperse a release agent at a satisfactory level, (1) a certain degree of viscosity at temperatures where it is kneaded with resin must be kept and (2) the release agent must be in a content of about 5 parts by weight or less. Because of such restrictions, the toners produced by pulverization have a limit to their fixing performance.

In this melt-kneading and pulverization process, it is difficult to disperse solid fine particles of colorants or the like completely uniformly in the resin, and some toners may have a distribution in composition depending on the degree of dispersion to cause variations in developing performance of the toners. In addition, the resolution, solid-area uniformity and gradation reproducibility of images formed by toners commonly depends on the properties of toners, especially their particle diameter, in a large proportion, where the use of toners with a smaller particle diameter brings about images with higher quality. Accordingly, recently available printers and high-grade copying machines often make use of toners with a small particle diameter. However, in making toner particles have a smaller particle diameter by the pulverization process, about 5.0 μm in volume-average particle diameter is the limit because of the ability of grinding mills.

To overcome this problem, a toner production process in which a polymerizable monomer composition having at least a polymerizable monomer is subjected to suspension polymerization (hereinafter "polymerization toner") is proposed (Japanese Patent Publication No. 36-10231). In this process for producing toners by suspension polymerization, a polymerizable monomer and a colorant, and also optionally a polymerization initiator, a cross-linking agent and other additives are uniformly dissolved or dispersed to form a polymerizable monomer composition. Thereafter, this polymerizable monomer composition is dispersed in a continuous phase (e.g., an aqueous phase) containing a dispersion stabilizer, by means of a suitable agitator, and is simultaneously subjected to polymerization reaction to obtain toner particles having the desired particle diameters. Since this process has no restrictions on the items stated in the pulverization process and has various advantages, it has lately attracted considerable attention.

More specifically, since this toner production process has no step of pulverization at all, this is a production process in which toner materials are not especially required to be brittle and also by which toners whose colorants may hardly stand bare to the surfaces of toner particles can be obtained. Moreover, in the polymerization toner, a release agent component can be encapsulated in toner particles, and hence the release agent can be contained in a-larger quantity than the toners obtained by pulverization. As to the dispersibility of a colorant, too, it does not especially come into question because the colorant can be dissolved or dispersed uniformly in the polymerizable monomer together with other additives. The process further has such an advantage that it is adaptable to making particle diameter smaller because any desired particle diameter and particle size distribution can be controlled by dispersion and granulation conditions.

However, even such a polymerization toner has problems to be settled, which are as discussed below.

In the polymerization toner, where various materials are dissolved or dispersed in a polymerizable monomer system to form a polymerizable monomer composition which is then suspended and dispersed in an aqueous medium, it is not necessarily easy in technical view to suspend and granulate polymerizable monomer composition particles stably in accordance with a combination of materials, conditions and so forth and also to complete polymerization reaction under stable conditions not causative of any coalescence of particles.

Especially in recent years, systems to which electrophotographic techniques are applied are advancing rapidly not only in conventional office-work copying machines but also in color copying and in the field of printers as output devices of computers. Under such circumstances, the process constitution of various systems has become great in variety, and physical properties of toner which are required concurrently therewith have become required precisely not only in respect of conventional items, i.e., particle size distribution, fluidity and triboelectric charging performance, but also in respect of the controlling of toner particle shape and toner particle surface properties.

Thus, suspension granulation and polymerization stability for the polymerization toner have a very great influence not only on productivity but also on physical properties of toners, and are important factors. Unstable suspension granulation and polymerization conditions may cause coalescence and agglomeration of particles to damage the particle size distribution and triboelectric charging performance greatly, so that it becomes impossible to control the toner particle shape and surface state (or profile).

In the past, for the purposes of, e.g., making suspension granulation stable, preventing particles from coalescing during polymerization and allowing resultant particles to have a sharp particle size distribution, many proposals have been made, as exemplified by a method in which the particle size distribution is controlled using a dispersant and an anionic surface-active agent in combination, disclosed in Japanese Patent Application Laid-open No. 57-42052, and a method in which particle size is controlled by adding an aqueous polymerization inhibitor, disclosed in Japanese Patent Application Laid-open No. 57-41649, Japanese Patent Publication No. 1-55643 and Japanese Patent Applications Laid-open No. 6-73101 and No. 7-165847. However, the former method has such a disadvantage that the surface-active agent may remain, which makes the triboelectric charging performance of toner particles unstable, resulting in a great lowering of developing performance of the toner particles. The latter method has such an advantage that by-product emulsion polymerization fine particles can be removed, but it has a problem beyond it, such that the method is not effective for the reduction of microsuspension particles having problems as fine particles. The presence of such microsuspension particles has the disadvantages of causing jamming of toner during development and non-uniform triboelectric charging.

Meanwhile, many proposals are also made so as to solve the problems the polymerization toner has. For example, proposed is a method in which, as disclosed typically in Japanese Patent Applications Laid-open No. 9-54457 and No. 7-49586, a dispersion stabilizer once produced is solubilized using an acid and thereafter again precipitated using an alkali to obtain a desired dispersion stabilizer under alkaline conditions so that polymerization toner particles having a sharp particle size distribution are obtained using such a dispersion stabilizer. This proposal, however, is insufficient under the present situation where the controlling of even the toner particle shape and surface properties is required, and can not satisfy all the required physical properties.

Japanese Patent Application Laid-open No. 7-301949 also discloses a method in which an aqueous sodium phosphate solution and an aqueous calcium chloride solution are mixed to form calcium phosphate directly in a dispersion medium. This method is a superior method, but the aqueous medium comes to have a pH of about 10 when the aqueous medium is produced by the method disclosed in this publication. When the polymerizable monomer composition having a polymerizable monomer, a colorant and a charge control agent is dispersed and granulated in the aqueous medium having such a pH, the colorant and the charge control agent tend to become decomposed, dissolved and changed in properties by the alkali. Hence, the additives such as colorants and charge control agent may become decomposed, dissolved and changed in properties depending on the time and temperature applied for the production of toner particles, making it difficult to produce toner particles having the desired charge control performance and coloring power. Also, once the additives such as colorants and charge control agents have dissolved partly, the uniformly dispersed state of the polymerizable monomer composition particles may be damaged to produce fine particles in a large quantity or cause agglomeration of particles, tending to make the particle size distribution of the resultant particles non-uniform. Especially in the case of the additives such as colorants and charge control agents, which are susceptible to alkalis, some may greatly become decomposed, dissolved and changed in properties by the alkalis to become unusable. Hence, in order that toner particles stable in physical properties and particle size distribution can be produced in an aqueous medium having an alkalinity, it has been necessary to control production conditions strictly and also there have been limitations on the additives such as colorants and charge control agents.

For the purposes of making particles free from any coalescence during polymerization and achieving uniform particle size distribution in a stable suspension system, Japanese Patent Publication No. 3-76749 discloses the proposal that a polymerizable monomer composition containing an anionic polymer is dispersed in an aqueous medium containing an inorganic acid and a dispersion stabilizer having an organic group with a nitrogen atom. This is considerably effective. However, since a strong alkali is used when the nitrogen-containing dispersion stabilizer is removed, the problem as discussed above have still remained unsettled.

Thus, in the production of polymerization toners, any effective production process has not been found which satisfies all the conditions that no coalescence of particles during granulation and during polymerization occurs, particles are present in a stable state throughout the reaction, the resultant toner particles have sharp particle size distribution and uniform triboelectric charging performance always stably and in a good reproducibility, the toner particle shape and surface state can be controlled, and no limitations on the materials used as toner materials may be imposed.

SUMMARY OF THE INVENTION

The present invention provides a toner production process having solved the problems discussed above.

More specifically, an object of the present invention is to provide a toner production process in which the polymerizable monomer composition suspended and granulated in an aqueous medium can be kept dispersed always stably as particles and no coalescence of particles may occur during polymerization reaction, having a good reproducibility.

Another object of the present invention is to provide a toner production process by which the toner particles formed can have a sharp particle size distribution and uniform triboelectric charging performance always stably and in a good reproducibility.

Still another object of the present invention is to provide a toner production process which can control the toner particle shape and surface state of the toner particles to be formed, always stably and in a good reproducibility.

A further object of the present invention is to provide a toner production process which may impose no limitations on the materials used as materials for toner particles.

A still further object of the present invention is to provide a toner production process which can produce a toner capable of achieving superior image characteristics high and stable in image density and free from fogging.

To achieve the above objects, the present invention provides a process for producing a toner, comprising;

adjusting to from 4.0 to 6.0 the pH of an aqueous medium containing a calcium phosphate, which is prepared by mixing an aqueous phosphate solution with an aqueous calcium salt solution;

dispersing in the aqueous medium a polymerizable monomer composition having at least a polymerizable monomer, a colorant, a polar polymer or polar copolymer having a carboxyl group, and a polymerization initiator to form particles of the polymerizable monomer composition;

polymerizing in the aqueous medium the polymerizable monomer contained in the particles, to form toner particles; and adjusting the pH of the aqueous medium to from 1.0 to 3.0 to dissolve the calcium phosphate, followed by separating the toner particles from the aqueous medium;

the toner particles having a circularity of from 0.970 to less than 1.000 as measured with a flow type particle image analyzer (FPIA).

BRIEF DESCRIPTION OF THE DRAWING

Figure illustrates a device for measuring the quantity of triboelectricity of toner.

DESCRIPTION OF THE PREFERRED EMBODIMENTS

In the process of the present invention, polymerization is carried out in an aqueous medium containing a calcium phosphate (herein often referred to as "phosphate of calcium" so as to be distinguished from calcium phosphate per se). The phosphate of calcium used in the present invention plays in the aqueous medium a role as a dispersant for a polymerizable monomer composition.

Substances commonly considered as dispersants include, as inorganic dispersants, calcium phosphate, hydroxylapatite, magnesium phosphate, aluminum phosphate, zinc phosphate, calcium carbonate, magnesium carbonate, calcium hydroxide, magnesium hydroxide, aluminum hydroxide, calcium metasilicate, calcium sulfate, barium sulfate, bentonite, silica and alumina. As organic compounds, they include polyvinyl alcohol, gelatin, methyl cellulose, methyl hydroxypropyl cellulose, ethyl cellulose, carboxymethyl cellulose sodium salt, polyacrylic acid and salts thereof, and starch. When used, these are dispersed in aqueous phases.

It is considered that these dispersants prevent polymerizable monomer composition particles from agglomerating mutually which are present in the form of droplets dispersed uniformly in aqueous mediums and further adsorbed uniformly on the surfaces of these droplets to make the droplets stable. After the polymerization reaction of polymerizable monomers in the aqueous mediums has been completed, these dispersants are solubilized by alkali treatment or through washing with hot water, and separated from toner particles. However, for many of the above substances usable as dispersants, it is difficult to be removed completely from the toner particle surfaces because of their solubility, molecular weight, viscosity and so forth. Also, depending on the formulation of toner particles, colorants and charge control agents may become decomposed or dissolved out partly in the course of treatment with a strong alkali or washing with hot water, or may undergo thermal change in properties, so that the surface properties or triboelectric charging performance of toner particles may be damaged, resulting in a great lowering of developing performance of toners in some cases.

Some inorganic dispersants have so strong an agglomeration action that they may accelerate unstable phenomena such as agglomeration or coalescence of the droplets when, e.g., changes in viscosity occur in the course of polymerization reaction of droplets and the droplets becomes less stable. Thus, it is not easy to select dispersants.

The phosphate of calcium used as a dispersant in the present invention does not cause such difficulties, and can be removed readily from the toner particle surfaces only by acid treatment and water washing, thus it is effective as a dispersant. Also, since it can be removed by acid treatment and water washing, charge control agents and charge control agents may neither become decomposed nor become dissolved out and also the thermal change in properties need not to be taken into account.

The phosphate of calcium herein referred to includes calcium phosphate, calcium hydrogenphosphate, calcium dihydrogenphosphate, hydroxylapatite and a mixture of some of these. Taking account of the size of crystals of these salts, the particle diameter of crystal agglomerates and the effect of solubility to acids, hydroxylapatite and calcium phosphate are preferred. In particular, hydroxylapatite is most preferred.

The phosphate of calcium is formed out of an aqueous phosphate solution and an aqueous calcium salt solution in an aqueous medium, and put into use. Such a method is most effective and a stable state of suspension can be obtained when it is used as the dispersant, because any agglomerates do not occur and uniform fine-particle crystals can be obtained. When powdery calcium phosphates are used as they are, they tend to become strong agglomerates as powder, which agglomerates may have non-uniform particle diameters and are hard to disperse in the aqueous phase. As an additional advantage of the method of forming the phosphate of calcium in the aqueous medium, water-soluble neutral salts formed as by-products simultaneously with the phosphate of calcium have the effect of preventing the polymerizable monomer composition from dissolving in water and the effect of making the specific gravity of the aqueous medium greater.

As the aqueous phosphate solution used, an aqueous sodium phosphate solution is preferred. As the aqueous calcium salt solution, an aqueous calcium chloride solution is preferred. The aqueous sodium phosphate solution may preferably have pH from 10 to 14. In order to obtain truly spherical toner particles, an aqueous solution obtained by mixing the aqueous phosphate solution and the aqueous calcium salt solution without adjusting the pH may preferably have pH from 7 to 14.

The adjustment of pH at the time the phosphate of calcium is formed in the present invention will be described.

If the polymerizable monomer composition containing a polymerizable monomer, a colorant, a charge control agent and so forth is dispersed and granulated in an aqueous medium having pH 9.0 to 14.0, the colorant, charge control agent and so forth tend to become decomposed, dissolved and changed in properties by alkalis. Hence, depending on the time or temperature applied for the production of toner particles, the colorant, charge control agent and so forth become dissolved to make it difficult to produce toner particles having the desired charge control performance and coloring power. Also, once the colorant and charge control agent have dissolved partly, the uniformly dispersed state of the polymerizable monomer composition may be damaged to produce fine particles in a large quantity or cause agglomeration of particles, tending to make the particle size distribution of the resultant particles non-uniform. Hence, under such conditions that the aqueous medium has pH 9.0 to 14.0, it has been necessary, and difficult, to control production conditions strictly in order to obtain toner particles having a stable particle size distribution.

Studies made by the present inventors have revealed that the dispersant calcium phosphates contained in aqueous mediums have electric charges at their boundaries, depending on the pH of the aqueous mediums. Measurement of zeta potential has confirmed that, at the boundaries, calcium phosphates show negative electric charges in the alkaline side, isoelectric points in the neutrality and positive electric charges in the acid side.

In the present invention, when the phosphate of calcium is formed in an aqueous medium, the pH of the aqueous medium is adjusted to from 4.0 to 6.0, and preferably from 4.5 to 5.8. This makes it possible to produce with ease toner particles having stable physical properties and particle size distribution.

In the production process of the present invention, a polymerizable monomer composition having at least a polymerizable monomer, a colorant, a polar polymer or polar copolymer having a carboxyl group, and a polymerization initiator is dispersed in the aqueous medium as described above.

The polar polymer or polar copolymer having a carboxyl group, contained in the polymerizable monomer composition when granulated and polymerized in the aqueous medium having pH from 4.0 to 6.0 is hydrophilic, and hence, is locally present as the shells of the droplets to encapsulate other components of the composition. The toner particles thus obtained have what is called the core/shell structure, and exhibit stable triboelectric charging performance.

If, however, the aqueous medium is alkaline, the polar polymer or polar copolymer having a carboxyl group, which is negative, repels the dispersant as an action of electric charges because the dispersant stands negatively charged at the boundaries, so that it is hard for the polar polymer or polar copolymer component to be present stably as the shells, causing mutual agglomeration of droplets during the polymerization, and making it difficult to control particle size distribution, toner particle shape and surface properties and triboelectric charging performance, so that the reproducibility in the production of the toner is liable to be poor.

The core/shell structure the toner particles have can be confirmed by examining cross-sections of toner particles. Stated specifically, the cross-sectional structure of toner particles can be confirmed in the following way: Toner particles are thoroughly dispersed in a room temperature curing epoxy resin, followed by curing in an environment of temperature 40° C. for 2 days, and the cured product obtained is dyed with triruthenium tetraoxide optionally in combination with triosmium tetraoxide, thereafter samples are cut out in slices by means of a microtome having a diamond cutter to observe the sample using a transmission electron microscope (TEM). The toner particles obtained in the undermentioned Examples have been confirmed to have the core/shell structure.

Thus, in the present invention, the pH of the aqueous medium is adjusted to from 4.0 to 6.0 (preferably from 4.5 to 5.8) when the phosphate of calcium is formed, and the polymerizable monomer composition having at least a polymerizable monomer, a colorant, the polar polymer or polar copolymer having a carboxyl group, and a polymerization initiator is dispersed and granulated in the aqueous medium to obtain polymerizable monomer composition particles.

Here, if the process is carried out under conditions where the pH is lower than 4.0, the dispersant phosphate of calcium may be solubilized abruptly to make it impossible to maintain a stated dispersant concentration. Such pH region is not preferable when the phosphate of calcium is used as the dispersant.

In the present invention, the pH may be adjusted by using, e.g., a water-soluble inorganic acid such as hydrochloric acid, sulfuric acid, nitric acid or phosphoric acid. These inorganic acids may optionally be diluted with water to a stated concentration when used. An inorganic acid with a stated concentration may be added in such a quantity that the pH is adjusted appropriately to from 4.0 to 6.0 (preferably from 4.5 to 5.8) at the time the phosphate of calcium comes to be formed or after the phosphate of calcium has been formed stably. The water-soluble inorganic acid may preferably be added in an amount of from 0.3 to 0.9 mol per mol of phosphate in the aqueous phosphate solution in the case when a monovalent water-soluble inorganic acid is used, in an amount of from 0.15 to 0.45 mol per mol of phosphate in the aqueous phosphate solution in the case when a divalent water-soluble inorganic acid is used, and in an amount of from 0.1 to 0.3 mol per mol of phosphate in the aqueous phosphate solution in the case when a trivalent water-soluble inorganic acid is used.

As a more preferred method of adjusting the pH, an inorganic acid may be added previously in the aqueous phosphate solution in the stated quantity, i.e., in such a quantity that the pH is adjusted to from 4.0 to 6.0 (preferably from 4.5 to 5.8) after the phosphate of calcium has been formed stably, and then the aqueous calcium salt solution may be added to form the phosphate of calcium. In this instance, too, the inorganic acid may preferably be added in the quantity within the above range.

The electric charges at the boundaries of the phosphate of calcium within the pH range of from 4.0 to 6.0 stand stable as positive electric charges. Under such conditions, the positive electric charges are adsorbed by a stable electrostatic force on the surfaces of the polymerizable monomer composition particles containing the polar polymer or polar copolymer having a carboxyl group, which is negative. Hence, the polymerizable monomer composition can be prevented from causing agglomeration and coalescence during its granulation and polymerization, so that a sharp particle size distribution of the toner particles formed can be achieved in a good reproducibility. In addition, in the toner particles thus formed, the negative-polarity polymer or copolymer is locally present on the toner particle surfaces in an always stable state to provide the core/shell structure. Thus, toner particles having superior triboelectric charging performance can be obtained.

The droplets formed by granulation within this pH range are dispersed stably in water as the action of electric charges until the polymerization reaction is completed. Hence, as the shape of the toner particles thus formed, quite closely spherical particles can be obtained stably and in a good reproducibility. Though more or less different depending on the dispersant concentration and the constitution of the polymerizable monomer composition, in particular, the molecular weight and quantity of the polar polymer or polar copolymer having a carboxyl group and the type and quantity of the colorant, the toner particles have a circularity of from 0.970 to less than 1.000 as measured with a flow-type particle image analyzer (FPIA). Also, the toner particles thus formed are stable throughout the step of granulation and polymerization, and hence may very less cause contamination of or adhesion to the interior of a reaction tank, which has hitherto come into question. Thus, a great advantage can also be brought about in view of production efficiency.

Toner particles having a good circularity, a closely spherical shape and smooth surfaces commonly have a superior triboelectric charging performance and can be charged stably, and hence are characteristic of superior transfer performance in electrophotographic systems.

The toner particles thus obtained may preferably have a weight-average particle diameter of from 3 to 10 μm, and preferably from 4 to 9 μm in order to make image quality higher.

The properties required in toners may differ depending on the electrophotographic systems to which the toners are applied. In the present invention, since the toner particles can be produced always stably in such a state that the shape and surface condition are closely spherical, it is possible to provide toner particles adapted to electrophotographic systems in which a high transfer performance is required.

In addition, in the production of the toner, if the pH of the aqueous medium before the step of granulation is adjusted to the neutrality of about 7, the toner particles obtained have a shape which is not so truly spherical.

The toner particles formed in the present invention are, when just formed, in the state of the phosphate of calcium standing adsorbed on their surfaces. Accordingly, the pH of the aqueous medium containing the toner particles is adjusted to from 1.0 to 3.0 with the water-soluble inorganic acid to dissolve the phosphate of calcium completely, followed by filtration to separate the toner particles and further followed by water washing repeatedly, and then drying to obtain toner particles.

Here, as the solubility of the phosphate of calcium that depends on the pH, the phosphate of calcium becomes solubilized abruptly in a low-pH acidic region of pH from 3.0 to 4.0 as a boundary region, and is solubilized by 100% in a strongly acidic region of pH 3 or below. Thus, acid treatment at pH from 1.0 to 3.0 is necessary in order to remove dispersant particles completely from the toner particles.

In this acid treatment, unlike alkali treatment, the colorant, charge control agent and so forth in the toner composition do not become decomposed, dissolved and changed in properties, and hence by no means affect the toner properties greatly.

The polymerizable monomer used in the present invention may include styrene monomers such as styrene, o-methylstyrene, m-methylstyrene, p-methylstyrene, p-methoxystyrene and p-ethylstyrene; acrylic esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate and phenyl acrylate; methacrylic esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; and besides, monomers such as acrylonitrile, methacrylonitrile and acrylamide. These monomers may each be used alone or in a mixture of some of these.

As described previously, the polar polymer or polar copolymer having a carboxyl group is added to the polymerizable monomer composition used in the present invention. The polar polymer or polar copolymer having a carboxyl group, usable in the present invention is as exemplified below.

It may include homopolymers having as a monomer an unsaturated carboxylic acid such as acrylic acid or methacrylic acid, an unsaturated dibasic acid or an unsaturated dibasic acid anhydride, copolymers of any of the above monomers with a styrene monomer, unsaturated polyesters, and saturated polyesters.

Of these polar polymers or polar copolymers having a carboxyl group, preferred are a styrene-methacrylic acid copolymer, a styrene-acrylic acid copolymer, a styrene-acrylic acid-acrylate copolymer, a styrene-methacrylic acid-methacrylate copolymer, and saturated or unsaturated polyesters which are produced from an alcohol component and an acid component as enumerated below.

The polyesters may preferably be constituted of from 45 to 55 mol % of the alcohol component and from 55 to 45 mol % of the acid component in the whole components.

As the alcohol component, it may include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, a bisphenol derivative represented by the following Formula (I);

(I)

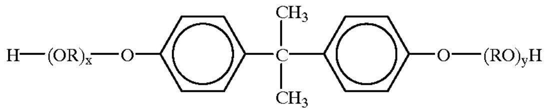

wherein R represents an ethylene group or a propylene group, x and y are each an integer of 1 or more, and an average value of x+y is 2 to 10; and a diol represented by the following Formula (II).

(II)

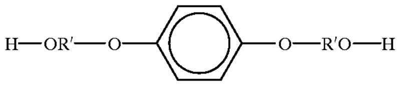

wherein R' represents

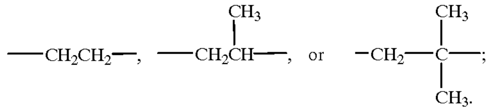

As a dibasic acid component which comprises at least 50 mol % in the total acid components, it may include benzene dicarboxylic acids and anhydrides thereof, such as phthalic acid, terephthalic acid, isophthalic acid and phthalic anhydride; alkyldicarboxylic acids such as succinic acid, adipic acid, sebacic acid and azelaic acid, and anhydrides thereof, and succinic acid substituted with an alkyl group or alkenyl group having 6 to 18 carbon atoms, or anhydrides thereof; and unsaturated dicarboxylic acids such as fumaric acid, maleic acid, citraconic acid and itaconic acid, or anhydrides thereof.

The alcohol component may further include polyhydric alcohols such as glycerol, pentaerythritol, sorbitol, sorbitan, and oxyalkylene ethers of novolak type phenol resin. As the acid component, it may include polycarboxylic acids such as trimellitic acid, pyromellitic acid and benzophenonetetracarboxylic acid, or anhydrides thereof.

A preferred alcohol component of the polyester resin is the bisphenol derivative represented by the above Formula (I). As a preferred acid component, it may include phthalic acid, terephthalic acid and isophthalic acid, or anhydrides thereof; succinic acid and n-dodecenylsuccinic acid, or anhydrides thereof; and dicarboxylic acids such as fumaric acid, maleic acid and maleic anhydride. As a cross-linking component, it may include trimellitic anhydride, benzophenonetetracarboxylic acid, pentaerythritol, and oxyalkylene ethers of novolak type phenol resins.

Any of these polar polymers or polar copolymers may preferably have an acid value of from 5 to 50 mg KOH/g in order to produce toner particles having a stable core/shell structure.

Any of these polar polymers or polar copolymers may preferably be used in an amount of from 1 to 35 parts by weight, and more preferably from 5 to 20 parts by weight, based on 100 parts by weight of the polymerizable monomer.

The polymerization initiator may include, azo or diazo type polymerization initiators such as
2,2'-azobis-(2,4-dimethylvaleronitrile),
2,2'-azobisisobutyronitrile),
1,1'-azobis-(cyclohexane-1-carbonitrile),
2,2'-azobis-4-methoxy-2,4-dimethylvaleronitrile and azobisisobutyronitrile; and peroxide type initiators or polymeric initiators having a peroxide in the side chain, such as benzoyl peroxide, methyl ethyl ketone peroxide, diisopropylperoxy carbonate, cumene hydroperoxide, t-butyl hydroperoxide, di-t-butyl hydroperoxide, dicumyl peroxide, 2,4-dichlorobenzoyl peroxide, lauroyl peroxide,
2,2-bis(4,4-t-butylperoxycyclohexyl)propane, and tris-(t-butoxyperoxy)triazine; polymeric initiators having a peroxide in the side chain; and persulfates such as potassium persulfate and ammonium persulfate; and hydrogen peroxide; any of which may be used.

The polymerization initiator may preferably be used in an amount of from 0.5 to 20 parts by weight based on 100 parts by weight of the polymerizable monomer, and may be used alone or in combination.

In the present invention, in order to control molecular weight, any known cross-linking agent and chain transfer agent may be added, which may preferably be added in an amount of from 0.001 to 15 parts by weight based on 100 parts by weight of the polymerizable monomer.

As a cross-linking agent preferably used, it may include divinylbenzene, divinylnaphthalene and their derivatives aromatic divinyl compounds; and besides diethylenic carboxylates such as ethylene glycol dimethacrylate, diethylene glycol methacrylate, triethylene glycol methacrylate, trimethylolpropane triacrylate, allyl methacrylate, tert-butylaminoethyl methacrylate, tetraethylene glycol dimethacrylate and 1,3-butanediol dimethacrylate; all sorts of divinyl compounds such as N-N-divinylanline, divinyl ether, divinyl sulfide and divinyl sulfone; and compounds having three or more vinyl groups; any of which may be used alone or in combination.

In the present invention, the charge control agent is added for the purpose of controlling the charging performance of toner.

As a negative charge control agent, it may include metal-containing salicylic acid compounds, metal-containing monoazo dye compounds, styrene-acrylic acid copolymers, imidazole derivatives, and styrene-methacrylic acid copolymers (N,N'-diaryl urea derivatives).

As a positive charge control agent, it may include Nigrosine and modified products thereof, modified with a fatty acid metal salt; quaternary ammonium salts such as tributylbenzylammonium 1-hydroxy-4-naphthosulfonate, tetrabutylammonium tetrafluoroborate, and analogues of these, onium salts such as phosphonium salts, and lake pigments of these; triphenylmethane dyes and lake pigments of these (a lake forming agent may include tungstophosphoric acid, molybdophosphoric acid, tungstomolybdophosphoric acid, tannic acid, lauric acid, gallic acid, ferricyanides and ferrocyanides); metal salts of higher fatty acid; diorganotin oxides such as dibutyltin oxide, dioctyltin oxide and dicyclohexyltin oxide; and diorganotin borates such as dibutyltin borate, dioctyltin borate and dicyclohexyltin borate. Any of these may be used alone or in a combination of two or more.

The dispersant used in the present invention is, as described previously, the phosphate of calcium, which may specifically include calcium phosphate, calcium hydrogenphosphate, calcium dihydrogenphosphate, hydroxylapatite, and mixtures of some of these. This dispersant may preferably be used in an amount of from 0.2 to 20 parts by weight based on 100 parts by weight of the polymerizable monomer.

In order to make these dispersants finely dispersible, a surface-active agent may be used in an amount of from 0.001 to 0.1 part by weight based on 100 parts by weight of the polymerizable monomer. This agent is used to accelerate the intended action of the dispersant. As its specific examples, it may include sodium dodecylbenzenesulfonate, sodium tetradecylsulfate, sodium pentadecylsulfate, sodium octylsulfate, sodium oleate, sodium laurate, potassium stearate and calcium oleate.

The release agent and low-energy fixing component used in the present invention may include paraffin polyolefin waxes, and modified products thereof, e.g., oxides or graft-treated products; and besides higher fatty acids, and metal salts thereof; amide waxes; ester waxes, e.g., polyfunctional polyester compounds having a tertiary or quaternary carbon atom and obtained from bifunctional or higher alcohol compounds or carboxylic acid compounds, polyfunctional polyester compounds having a primary or secondary carbon atom and obtained from bifunctional or higher alcohol compounds or carboxylic acid compounds, and monofunctional ester compounds having a tertiary or quaternary carbon.

In the toner production process of the present invention, the release agent may preferably be used in an amount of from 1 to 40 parts by weight, and more preferably from 3 to 35 parts by weight, based on 100 parts by weight of the polymerizable monomer.

The colorant used in the toner may include, e.g., as black pigments, carbon black, aniline black and acetylene black.

As a magenta pigment, it may include chrome orange, molybdenum orange, Permanent Orange GTR, Pyrazolone Orange, Benzidine Orange G, cadmium red, Permanent Red 4R, Watchung Red calcium salt, eosine lake, Brilliant Carmine 3B, Carmine 6B, manganese violet, Fast Violet B, Methyl Violet Lake, Rhodamine Lake, Alizarine Lake, iron red oxide, and quinacridone; C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, 209; C.I. Pigment Violet 19; and C.I. Vat Red 1, 2, 10, 13, 15, 23, 29, 35.

As a cyan pigment, it may include C.I. Pigment Blue 2, 3, 15, 16, 17; C.I. Vat Blue 6; C.I. Acid Blue 45; Indanthrene Blue, prussian blue, cobalt blue, Alkali Blue Lake, Victoria Blue Lake, Phthalocyanine Blue, Fast Sky Blue, Indanthrene Blue BC, chrome green, chromium oxide, Pigment Green B, Malachite Green Lake and Final Yellow Green G.

As a yellow pigment, it may include Naphthol Yellow, Hanza Yellow, chrome yellow, cadmium yellow, mineral first yellow, naples yellow, Permanent Yellow NCG, and Tartrazine Lake; C.I. Pigment Yellow 1, 2, 3, 4, 5, 6, 7. 10, 11, 12, 13, 14, 15, 16, 17, 23, 65, 73, 83, 93, 97, 120, 127, 174, 176, 180, 191; and C.I. Vat Yellow 1, 3, 20. Of these, C.I. Pigment Yellow 93 is preferable in view of light-resistance.

Any of these pigments may be used in a quantity necessary for maintaining optical density of fixed images, and may preferably be added in an amount of from 0.1 to 20 parts by weight, and more preferably from 0.2 to 10 parts by weight, based on 100 parts by weight of of the binder resin.

A dye used as the colorant is exemplified by the following.

As a magenta dye, it may include C.I. Solvent Red 1, 3, 8, 23, 24, 25, 27, 30, 49, 81, 82, 83, 84, 100, 109, 121; C.I. Disperse Red 9; C.I. Solvent Violet 8, 13, 14, 21, 27; C.I. Disperse Violet 1; C.I. Basic Red 1, 2, 9, 12, 13, 14, 15, 17, 18, 22, 23, 24, 27, 29, 32, 34, 35, 36, 37, 38, 39, 40; C.I. Basic Violet 1, 3, 7, 10, 14, 15, 21, 25, 26, 27, 28; C.I. Direct Red 1, 4; C.I. Acid Red 1; and C.I. Mordant Red 30.

As a cyan dye, it may include C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, and C.I. Basic Green 6.

As a yellow dye, it may include C.I. Solvent Yellow 9, 7, 24, 31, 35, 58, 93, 100, 102, 103, 105, 112, 162, 163; and C.I. Disperse Yellow 3, 42, 64, 82, 160, 201, 224.

Any of these dyes may preferably be added in an amount of from 0.1 to 20 parts by weight, and more preferably from 0.3 to 10 parts by weight, based on 100 parts by weight of the binder resin.

Attention must be paid to polymerization inhibitory action or aqueous-phase transfer properties inherent in the colorants. The surfaces of colorants may preferably be modified, e.g., be subjected to hydrophobic treatment using materials free from polymerization inhibition. In particular, most dye type colorants and carbon black have such polymerization inhibitory action and hence care should be taken when used. A preferable method for the surface treatment of the dyes may include a method in which polymerizable monomers are polymerized previously in the presence of any of these dyes. The resulting colored polymer may be added to the polymerizable monomer composition. With regard to the carbon black, besides the same treatment as the above on the dyes, it may be treated with a material capable of reacting with surface functional groups of the carbon black, as exemplified by organopolysiloxane.

As the water-soluble inorganic acid used to adjust the pH in the present invention, as described previously, used are hydrochloric acid, sulfuric acid, nitric acid or phosphoric acid. As alkalis, usable-are alkaline substances such as ammonium hydroxide, potassium hydroxide, sodium hydroxide, calcium hydroxide, sodium carbonate, potassium carbonate, ammonium carbonate, ammonium hydrogencarbonate, sodium hydrogencarbonate and sodium phosphate, and hydrates or aqueous solutions thereof. These substances may optionally be diluted so as to be used as aqueous solutions with a specific concentration.

External additives usable in the present invention may include, e.g., oxides such as alumina, titanium oxide, silica, zirconium oxide and magnesium oxide, and besides silicon carbide, silicon nitride, boron nitride, aluminum nitride, magnesium carbonate and organosilicon compounds.

It is preferable for the above fine powder to have been subjected to hydrophobic treatment so that the toner can be less dependent on environmental conditions such as temperature and humidity and also the fine powder can be prevented from coming off toner particle surfaces. Agents for this hydrophobic treatment may include, e.g., coupling agents such as silane coupling agents, titanium coupling agents and aluminum coupling agents, and oils such as silicone oil, fluorine type oils and various modified oils.

Of these known external additives, silica, alumina, titanium oxide or double oxides thereof may preferably be selected in order to improve charging stability, developing performance, fluidity and storage stability. In particular, silica is preferred in view of such an advantage that coalescence of primary particles can be controlled arbitrarily to some extent in accordance with starting materials or oxidation conditions such as temperature. Such silica includes the so-called dry-process silica or fumed silica produced by vapor phase oxidation of silicon halides or alkoxides and the so-called wet-process silica produced from alkoxides or water glass, either of which can be used. The dry-process silica is preferred, as having less silanol groups on the surface and inside and leaving no production residue such as $Na_2O$ and $SO_3^{2-}$. In the dry-process silica, it is also possible to use, in its production step, other metal halide such as aluminum chloride or titanium chloride together with the silicon halide to obtain a composite fine powder of silica with other metal oxide.

The external additive may preferably be added in an amount of from 0.1 to 3 parts by weight based on 100 parts by weight of the toner particles in order to make toner's charge quantity stable, to make its bulk density stable and to make its stability higher when left standing in an environment of high humidity. Any of these external additives may be used in a combination of two or more. External additives which may preferably further additionally be used in combination will be described below.

In order to improve transfer performance and/or cleaning performance, inorganic or organic closely spherical fine particles having a primary particle diameter of 50 nm or larger (preferably having a specific surface area smaller than 50 $m^2/g$) may further be added. This is one of the preferred embodiments. For example, spherical silica particles, spherical polymethylsil sesquioxane particles and spherical resin particles may preferably be used.

Other additives may also be used which may include, e.g., lubricant powders such as Teflon powder, zinc stearate powder and polyvinylidene fluoride powder; abrasives such as cerium oxide powder, silicon carbide powder and strontium titanate powder; anti-cakinging agents such as titanium oxide powder and aluminum oxide powder; and conductivity-providing agents such as carbon black powder, zinc oxide powder and tin oxide powder. Reverse-polarity organic particles and inorganic particles may also be used in a small quantity as a developability improver.

The toner produced by the process of the present invention may also be incorporated with a magnetic material so that it can be used as a magnetic toner. In this case, the magnetic material may also serve as the colorant. In the present invention, the magnetic material contained in the magnetic toner may include iron oxides such as magnetite, hematite and ferrite; metals such as iron, cobalt and nickel, or alloys of any of these metals with a metal such as aluminum, cobalt, copper, lead, magnesium, tin, zinc, antimony, beryllium, bismuth, cadmium, calcium, manganese, selenium, titanium, tungsten or vanadium, and mixtures of any of these.

These magnetic materials may preferably be those having an average particle diameter of 2 $\mu$m or less, and preferably from 0.1 to 0.5 $\mu$m. The magnetic material may preferably be contained in the toner in an amount of from 20 to 200 parts by weight, and particularly preferably from 40 to 150 parts by weight, based on 100 parts by weight of the resin component.

The magnetic material may preferably be those having a coercive force (Hc) of from 20 to 300 oersted, a saturation magnetization (σs) of from 50 to 200 emu/g and a residual magnetization (σr) of from 2 to 20 emu/g, as magnetic characteristics under the application of 10 K oersted.

The toner of the present invention can usually be used as a toner for one-component developers, or as a toner for two-component developers.

For example, as a one-component developer, in the case of a magnetic toner comprising toner particles incorporated with the magnetic material, there is a method in which the magnetic toner is transported and electrostatically charged, utilizing a developing sleeve provided internally with a magnet. When a non-magnetic toner containing no magnetic material is used, there is a method in which the toner is transported by triboelectrically charging it forcedly with a blade or a fur brush at a developing sleeve and causing it to adhere onto the sleeve.

As for the instance where the toner is used as a two-component developer commonly used, a carrier is used together with the toner according to the present invention. There are no particular limitations on the carrier used. Principally, a carrier produced solely using iron, copper, zinc, nickel, cobalt, manganese or chromium, a composite ferrite, or a carrier whose core particles are coated with resin may be used. The shape of carrier particles is also important in view of such an advantage that the saturation magnetization and electrical resistivity can be controlled in a wide range. For example, it is preferable to select spherical, flat or shapeless particles and also to control the microstructure of carrier particle surfaces, e.g., surface unevenness. The resin-coated carrier is commonly obtained using a method in which the above inorganic oxide is fired and granulated to beforehand produce carrier core particles, which are thereafter coated with resin. From the meaning of decreasing the load of carrier on toner, it is also possible to use a method in which the inorganic oxide and the resin are kneaded, followed by pulverization and classification to obtain a low-density dispersed carrier, or a method for obtaining a polymerization carrier in which a kneaded product of an inorganic oxide and monomers is subjected directly to suspension polymerization in an aqueous medium to obtain a true-spherical dispersed carrier.

A coated carrier comprising carrier core particles coated with a coating material such as resin is particularly preferred. As a method for such coating, a coating material dissolved or suspended in a solvent may be applied to adhere to carrier particles, or the coating material is merely mixed in the form of powder. Any of such conventional methods may be used.

The material to be applied onto the carrier core particle surfaces may differ depending on toner materials. For example, it is suitable to use, alone or in combination, polytetrafluoroethylene, monochlorotrifluoroethylene copolymer, polyvinylidene fluoride, silicone resin, polyester resin, a metal oxide of di-tert-butylsalicylic acid, styrene resin, acrylic resin, polyamide, polyvinyl butyral, Nigrosine, aminoacrylate resin, a basic dye or a lake compound thereof, fine silica powder and fine alumina powder, but not necessarily limited to these.

Usually, in the treatment, the above material may preferably be used in an amount of from 0.1 to 30% by weight, and more preferably from 0.5 to 20% by weight, in total based on 100% by weight of the carrier.

The carrier may preferably have an average particle diameter of from 10 to 100 μm, and more preferably from 20 to 50 μm.

As a particularly preferred embodiment, the carrier is a coated ferrite carrier comprising Cu—Zn—Fe three-component ferrite particles whose surfaces are coated with a mixture comprised of a combination of resins such as a fluorine resin and a styrene resin (e.g., a combination of polyvinylidene fluoride with styrene-methyl methacrylate resin, polytetrafluoro-ethylene with styrene-methyl methacrylate resin or a fluorine type copolymer with a styrene type copolymer, in a ratio of from 90:10 to 20:80, and preferably from 70:30 to 30:70) in a coating weight of from 0.01 to 5% by weight, and preferably from 0.1 to 1% by weight, containing 70% by weight or more of 250 mesh-pass and 400 mesh-on carrier particles (passing through 250 meshes and caught in 400 meshes) and having the above average particle diameter. The fluorine type copolymer is exemplified by a vinylidene fluoride-tetrafluoroethylene copolymer (10:90 to 90:10) and the styrene type copolymer is exemplified by a styrene-2-ethylhexyl acrylate (20:80 to 80:20) and a styrene-2-ethylhexyl acrylate-methyl methacrylate copolymer (20 to 60:5 to 30:10 to 50).

The above coated ferrite carrier has a sharp particle size distribution, can provide a triboelectric chargeability preferable for the toner according to the present invention, and also is effective for improving electrophotographic performances.

When the two-component developer is prepared by blending the toner according to the present invention and the carrier, good results can be obtained when they are blended in such a proportion that the toner concentration in the developer is from 2% by weight to 15% by weight, and preferably from 4% by weight to 13% by weight. If the toner concentration is less than 2% by weight, images may have too low a density to be tolerable in practical use. If it is more than 15% by weight, fog and in-machine toner scatter may occur to shorten the service life of the developer.

The carrier may preferably have the following magnetic properties. Magnetization intensity at 1,000 oersted ($\sigma_{1,000}$) after having been saturated magnetically is required to be from 30 to 300 emu/$cm^3$. In order to achieve a higher image quality, it is more preferably from 100 to 250 emu/$cm^3$. If it is greater than 300 emu/$cm^3$, it becomes difficult to obtain toner images with a high image quality. If it is less than 30 emu/$cm^3$, carrier adhesion tends to occur because of a decrease in magnetic restraint force.

An embodiment of the toner production process according to the present invention is shown below.

A polymerizable monomer composition is prepared which comprises the polymerizable monomer and added therein the polar polymer or polar copolymer having a carboxyl group, the release agent, the charge control agent, the colorant, the polymerization initiator and other additives, having been uniformly dissolved or dispersed by means of a media type mill or the like. Meanwhile, when forming the phosphate of calcium by mixing the aqueous phosphate solution and the aqueous calcium salt solution, the pH of an aqueous medium containing the phosphate of calcium is adjusted to 4.0 to 6.0 using a dilute solution of the water-soluble inorganic acid such as hydrochloric acid, sulfuric acid or nitric acid. In the adjustment of pH, the acid thus diluted may be added after the phosphate of calcium has been formed by the two-part mixing. Alternatively, it may be added previously in the aqueous phosphate solution or in the aqueous calcium salt solution before the two-part mixing, and thereafter the aqueous calcium salt solution or aqueous phosphate solution may be mixed to cause the phosphate of calcium to precipitate. It is advantageous to form this phosphate of calcium in a dispersion granulator such as a homomixer or a homogenizer. Alternatively, an aqueous dispersion of the phosphate of calcium having been formed separately may be introduced into the dispersion granulator.

Into the aqueous medium thus pH-adjusted and containing the phosphate of calcium, the above polymerizable monomer composition is introduced and dispersed to carry out granulation. The particles in the monomer system are kept in a stable condition by the action of the phosphate of calcium as a dispersion stabilizer, and also agitation is carried out to such an extent that the particles in the monomer system can be prevented from settling. Thus, the polymerization proceeds stably without causing any agglomeration or coalescence of particles along the progress of polymerization reaction. The polymerization may be carried out at a polymerization temperature set at 40° C. or above, usually from 50 to 90° C.

At the latter half of the polymerization, the temperature may be raised, and also the aqueous medium may be removed partly from the reaction system at the latter half of the reaction or after the reaction has been completed, in order to remove unreacted polymerizable monomers, by-products and so forth which are causative of a smell at the time of toner fixing. After the reaction has been completed, in order to remove the phosphate of calcium from the toner particles formed, the water-soluble inorganic acid such as hydrochloric acid, sulfuric acid or nitric acid is further added to adjust the pH of the aqueous medium to 1.0 to 3.0, making a treatment for a stated time, followed by washing thoroughly with water. Thereafter the toner particles are collected by filtration and dried, followed optionally by classification to obtain toner particles.

In such suspension polymerization, water may usually be used as a dispersion medium preferably in an amount of from 300 to 3,000 parts by weight based on 100 parts by weight of the polymerizable monomer composition.

Methods of measurement which are used in the present invention will be described below.

(1) Measurement of Particle Diameter and Particle Size Distribution of Toner Particles As a measuring device, a Coulter counter Model TA-II (manufactured by Coulter Electronics, Inc.) is used. An interface (manufactured by Nikkaki k.k.) that outputs number-average distribution and volume-average distribution and a personal computer CX-1 (manufactured by CANON INC.) are connected. As an electrolytic solution, an aqueous 1% NaCl solution is prepared using first-grade sodium chloride.

Measurement is made by adding as a dispersant 0.1 to 5 ml of a surface active agent, preferably an alkylbenzene sulfonate, to 100 to 150 ml of the above aqueous electrolytic solution, and further adding 0.5 to 50 mg of a sample to be measured. The electrolytic solution in which the sample has been suspended is subjected to dispersion for about 1 minute to about 3 minutes in an ultrasonic dispersion machine. The volume-average distribution and number-average distribution of the toner are calculated by measuring the particle size distribution of particles of 2 to 40 μm by means of the Coulter counter Model TA-II, using an aperture of 100 μm as its aperture.

From the volume-average distribution and number-average distribution thus determined, weight-average particle diameter D4 and number-average particle diameter D1 are found.

From the values of D4 and D1, D4/D1 is calculated as particle size distribution breadth, the value obtained is used as a criterion of the judgment of agglomeration and coalescence of the toner particles formed. More specifically, it can be judged that, when the value of D4/D1 is large, the toner particles have formed secondary agglomerates or have coalesced in some degree and, when the value of D4/D1 is close to 1.0, the condition of particles approaches a monodisperse particle size distribution.

(2) Measurement of Quantity of Triboelectricity of Toner Particles

To measure the quantity of triboelectricity, the toner and carrier are left for 24 hours in an environment of normal temperature and normal humidity (23° C./60% RH), and thereafter the quantity of triboelectricity is measured by the blow-off process in the following manner.

Figure illustrates a device for measuring the quantity of triboelectricity of toner. A 1:49 mixture (weight ratio) of toner and carrier on which toner the quantity of triboelectricity is to be measured is put in a bottle with a volume of 50 to 100 ml, made of polyethylene, and shaked manually for 5 to 10 minutes. Thereafter, about 0.5 to 1.5 g of the mixture (developer) is put in a measuring container 2 made of a metal at the bottom of which a screen 3 of 500 meshes is provided, and the container is covered with a plate 4 made of a metal. The total weight of the measuring container 2 is weighed and is expressed as W1 (g). Next, in a suction device 1 (made of an insulating material at least at the part coming into contact with the measuring container 2), air is sucked from a suction opening 7 and an air-flow control valve 6 is operated to control the pressure indicated by a vacuum indicator 5, to be 250 mmAq. In this state, suction is carried out well, preferably for 2 minute, to remove the toner by suction. The potential indicated by a potentiometer 9 is expressed as V (volt). Herein, reference numeral 8 denotes a capacitor, whose capacitance is expressed as C (μF). The total weight of the measuring container after completion of the suction is also weighed and is expressed as W2 (g). The quantity of triboelectricity (μC/g) of the toner is calculated as shown by the following expression. Quantity of triboelectricity (μC/g) of toner $$=(C\times V)/(W1-W2)$$

(3) Measurement of Circularity Using Flow Type Particle Image Analyzer (FPIA)

The circularity referred to in the present invention is used as a simple and easy way to express quantitatively the shape of particles. In the present invention, it is measured with a flow type particle image analyzer FPIA-1000, manufactured by Toa Iyoudenshi K.K., and a value found from the following expression is defined to be the circularity.

$$\text{Circularity } a=Lo/L \quad (1)$$

wherein Lo represents a circumferential length of a circle having the same projected area as a particle image, and L represents a circumferential length of the particle image.

As a specific way of measurement, from 0.1 to 0.5 ml of a surface active agent, preferably an alkylbenzenesulfonate, is added as a dispersant in from 100 to 150 ml of water in a container, from which impurity solid matter has been removed, and a sample for measurement is further added in an amount of from about 0.1 to 0.5 g. A suspension in which the sample has been dispersed provisionally is subjected to dispersion for about 1 to 3 minutes by means of an ultrasonic dispersion mixer to obtain a dispersion with a concentration of from 3,000 to 10,000 particles/μl, where the shape of toner particles is measured with the above analyzer.

The circularity referred to in the present invention is an index of the degree of irregularities of toner particles. It is indicated as 1.000 when a toner particle is perfectly spherical, and the circularity is indicated by a smaller value as the surface has a more complicated shape.

(4) Measurement of Acid Value

The acid value of the polar polymer or polar copolymer having a carboxyl group, used in the present invention is determined in the following way.

Into a 200 ml Erlenmeyer flask, 2 to 10 g of the polar polymer or polar copolymer is weighed and put, followed by addition of about 50 ml of a 30:70 mixed solvent of methanol and toluene to dissolve the sample. Then, using a 0.1% mixed reagent of Bromothymol Blue and Phenol Red, titration is made in 0.1 M potassium hydroxide-ethanol solution standardized previously, and the acid value is calculated from the consumption of the potassium hydroxide-ethanol solution according the following expression.

$$\text{Acid value (mg KOH/g)}=\text{KOH (ml)}\times f\times 56.1/\text{sample weight } (g)$$

wherein f represents a factor of the 0.1 M potassium hydroxide-ethanol solution.

EXAMPLES

The present invention will be described below in greater detail by giving Examples, which, however, by no means limit the present invention. In the following formulation, “part(s)” refers to “part(s) by weight” unless particularly noted.

Example 1

Into 1,000 parts of ion-exchanged water, introduced were 510 parts of an aqueous 0.1 M sodium phosphate solution (pH: 11.7) prepared using sodium phosphate of an industrial grade, and 1 M hydrochloric acid in such an appropriate quantity that the pH after the addition of an aqueous calcium chloride solution came to be 5.2. The mixture obtained was heated to 60° C., and thereafter stirred at 12,000 rpm using a TK-type homomixer (manufactured by Tokushu Kika Kogyo Co., Ltd.). The pH of the aqueous solution after the addition of hydrochloric acid was 11.5. Then, 75 parts of an aqueous 1.0 M calcium chloride solution prepared using calcium chloride of an industrial grade was added thereto little by little to obtain an aqueous medium containing hydroxylapatite, the phosphate of calcium, and having pH 5.2. On the other hand, when 510 parts of an aqueous 0.1 M sodium phosphate solution and 75 parts of an aqueous 1.0 M calcium chloride solution were mixed without adjusting the pH with hydrochloric acid, the pH of the aqueous solution thus prepared was 10.1.

Styrene monomer 160 parts

2-Butyl acrylate monomer 40 parts

Saturated polyester resin (weight-average molecular weight: about 15,000; acid value: 20 mg KOH/g) 10 parts Copper phthalocyanine pigment 10 parts Aluminum di-tert-butylsalicylate compound 2.5 parts Microcrystalline wax (m.p.:65° C.) 35 parts Meanwhile, the above materials were heated to 60° C., and dissolved and dispersed uniformly at 12,000 rpm by means of a TK-type homomixer (manufactured by Tokushu Kika Kogyo Co., Ltd.). In the mixture obtained, 5 parts of a polymerization initiator 2,2'-azobis(2,4-dimethylvaleronitrile) was dissolved. Thus, a polymerizable monomer composition was prepared.

The polymerizable monomer composition thus obtained was introduced into the above aqueous medium, followed by stirring at 10,000 rpm for 10 minutes at 60° C. in an atmosphere of nitrogen by means of the TK-type homomixer, carrying out granulation of the polymerizable monomer composition. Thereafter, the temperature was raised to 80° C. and the reaction was carried out for 10 hours while stirring with paddle stirring blades. After the polymerization reaction was completed, the residual monomers were evaporated under reduced pressure, the reaction product was cooled, and thereafter hydrochloric acid was added to dissolve the hydroxylapatite completely, followed by filtration, washing with water and drying to produce toner particles.

Subsequently, toner particles were repeatedly produced 10 times in total in the same formulation and under the same conditions, and every time the production was made, each item of the particle size distribution breadth (D4/D1), quantity of triboelectricity, FPIA circularity and transfer efficiency was measured, obtaining average values and standard deviation SD values of the respective values. As the result, for all the items, preferable values were shown as the average values, and the standard deviations were small, thus good results were obtained. There was also no problem concerning the contamination of the reaction tank.

The toner particles obtained were blended with a carrier so as to be in a toner concentration of 6% by weight; the carrier being produced by coating with acrylic resin the surfaces of copper-zinc-ferrite particles 45 to 50 μm in particle diameter. Thus, a two-component developer was prepared. Using this developer, images were formed by the use of a full-color copying machine CLC-700 (manufactured by CANON INC.). As a result, good images were obtained which were free from defects such as fog, image lines, hollow characters and so forth.

The polymerization was further repeated according to various reaction sequences (combination of temperature and time), in the same formulation and in such a way that, e.g., after the granulation was carried out at 50 to 60° C., the polymerization was carried out at the same temperature for 3 to 7 hours and further the temperature was raised to 70 to 90° C. to carry out polymerization for a reaction time of 10 hours in total. In such an instance, too, toner particles having a good particle size distribution and good triboelectric charging performance were obtained.

Example 2

Toner particles were obtained in entirely the same manner as in Example 1 except that the pH of the aqueous medium containing hydroxylapatite formed was so adjusted as to be 4.2 by changing the quantity of the 1 M hydrochloric acid added dropwise. This production was further repeated to produce toner particles 10 times in total, and the average values and standard deviations were calculated for all the items.

As the result, for all the items, preferable values were shown as the average values, and the standard deviations were small, thus good results were obtained. The results are shown in Table 1.

Example 3

Toner particles were obtained in entirely the same manner as in Example 1 except that the pH of the aqueous medium containing hydroxylapatite formed was so adjusted as to be 5.8 by changing the quantity of the 1 M hydrochloric acid added dropwise and 10 parts of the copper phthalocyanine pigment was replaced with 10 parts of C.I. Pigment Yellow 13. This production was further repeated to produce toner particles 10 times in total, and the average values and standard deviations were calculated for all the items.

As the result, on the all items, preferable values were shown as the average values, and the standard deviations were small, thus good results were obtained. The results are shown in Table 1.

Example 4

Toner particles were obtained in entirely the same manner as in Example 1 except that the pH of the aqueous medium containing hydroxylapatite formed was so adjusted as to be 4.8 by changing the quantity of the 1 M hydrochloric acid added dropwise and 10 parts of the copper phthalocyanine pigment was replaced with 7.5 parts of magenta pigment quinacridone. This production was further repeated to produce toner particles 10 times in total, and the average values and standard deviations were calculated for all the items.

As the result, for all the items, preferable vaLues were shown as the average values, and the standard deviations were small, thus good results were obtained. The results are shown in Table 1.

Comparative Example 1

In 710 parts of ion-exchanged water, 460 parts of an aqueous 0.1 M sodium phosphate solution (pH: 11.7) prepared using sodium phosphate of an industrial grade was added, and 70 parts of an aqueous 1.0 M calcium chloride solution prepared using first-grade reagent calcium chloride was further added thereto little by little to produce an aqueous medium containing a phosphate of calcium and having pH 10.0. Toner particles were obtained in the same manner as in Example 1 except that suspension polymerization was carried out using this aqueous medium. This production was further repeated to produce toner particles 10 times in total under the same conditions, and the average values and standard deviations were calculated for all the items.

As the result, the standard deviations were great in all the items, and it was found that the stability and reproducibility of toner particles formed by repeating the production in the same formulation and under the same conditions were inferior to those in Examples.

Results inferior to those in Examples were also obtained with regard to the contamination of the reaction tank.

The polymerization was further repeated according to various reaction sequences (combination of temperature and time) in the same manner as in Example 1. As the result, especially when the reaction was carried out at a low conversion of polymerization, at a relatively high temperature and for a long time, agglomerates of particles formed tended to occur, and the contamination and adhesion in the reaction tank also occurred greatly, resulting in a quite broad particle size distribution, so that toner particles having an unstable triboelectric charging performance were obtained.

Comparative Example 2

Toner particles were obtained in entirely the same manner as in Example 1 except that the pH was 3.8 at the time of acid washing of toner particles formed. This production was further repeated to produce toner particles 10 times in total, and the average values and standard deviations were calculated for all the items.

In this instance, the quantity of triboelectricity and transfer efficiency showed low average values, and the standard deviations were great in all the items. Thus, it was found that the toner particles formed were inferior in stability and reproducibility.

Results inferior to those in Examples were also obtained with regard to the contamination of the reaction tank.

Reference Example 1

Toner particles were obtained in entirely the same manner as in Example 1 except that the pH of the aqueous medium containing hydroxylapatite formed was so adjusted as to be 6.8 by changing the quantity of the 1 M hydrochloric acid added dropwise. This production was further repeated to produce toner particles 10 times in total, and the average values and standard deviations were calculated for all the items.

As the result, although the circularity of toner particles and the average value of transfer efficiency were slightly inferior to those of Examples, good results were obtained on the other items and the standard deviations.

Example 5

Into 1,000 parts of ion-exchanged water, 510 parts of an aqueous 0.1 M sodium phosphate solution (pH: 11.7) prepared using sodium phosphate of an industrial grade was introduced. The mixture obtained was heated to 60° C., and thereafter stirred at 12,000 rpm using a TK-type homomixer (manufactured by Tokushu Kika Kogyo Co., Ltd.). Then, 75 parts of an aqueous 1.0 M calcium chloride solution prepared using calcium chloride of an industrial grade was added thereto little by little, and thereafter 1 M hydrochloric acid was added dropwise thereto in an appropriate quantity, obtaining an aqueous medium containing hydroxylapatite. The pH of the aqueous solution after the addition of the aqueous calcium chloride solution was 10.2, and the pH of the aqueous solution after the addition of hydrochloric acid was 5.5.

Styrene monomer 160 parts

2-Butyl acrylate monomer 40 parts

C.I. Pigment Yellow 7.5 parts

Styrene-methacrylic acid-methyl methacrylate copolymer (monomer weight ratio: 85:5:10; weight-average molecular weight: about 57,000; acid value: 32 mg KOH/g) 9 parts Aluminium di-tert-butylsalicylate compound 5 parts Microcrystalline wax (m.p.: 65° C.) 45 parts Meanwhile, the above materials were heated to 60° C., and dissolved and dispersed uniformly at 12,000 rpm by means of a TK-type homomixer (manufactured by Tokushu Kika Kogyo Co., Ltd.). In the mixture obtained, 9 parts of a polymerization initiator 2,2'-azobis(2,4-dimethylvaleronitrile) was dissolved. Thus, a polymerizable monomer composition was prepared.

The polymerizable monomer composition thus obtained was introduced into the above aqueous medium, followed by stirring at 10,000 rpm for 22 minutes at 60° C. in an atmosphere of nitrogen by means of the TK-type homomixer, to carry out granulation of the polymerizable monomer composition. Thereafter, the reaction was carried out at 60° C. for 2 hours while stirring with paddle stirring blades. At this stage, 700 parts of a dispersion medium prepared in the same manner as in the above was added, and the reaction was further carried out at 60° C. for 8 hours. After the polymerization reaction was completed, hydrochloric acid was added to dissolve the calcium phosphate, followed by filtration, washing with water and drying to produce toner particles.

Subsequently, toner particles were repeatedly produced 10 times in total in the same formulation and under the same conditions, and the average values and standard deviations were calculated for all the items in the same manner as in Example 1.

As the result, for all the items, preferable values were shown as the average values, and the standard deviations were small, thus good results were obtained. The results are shown in Table 1.

To 100 parts of the toner particles thus obtained, 1 part of fine silica particles (BET specific surface area: 300 $m^2/g$) were added to prepare a developer. Using this developer, images were formed using a color printer CANON LASER SHOT BP2030 (manufactured by CANON INC.). As a result, good images were obtained which were free from defects such as fog, image lines, hollow characters and so forth.

Example 6

Toner particles were produced in entirely the same manner as in Example 5 except that the pH of the aqueous medium was adjusted to 4.3 using nitric acid. This production was further repeated to produce toner particles 10 times in total, and the average values and standard deviations were calculated for all the items in the same manner as in Example 1.

As the result, for all the items, preferable values w ere shown as the average values, and the standard deviations were small, thus good results were obtained. The results are shown in Table 1.

Comparative Example 3

Toner particles were produced in entirely the same manner as in Example 5 except that the pH of the aqueous medium was adjusted to 3.3 by changing the quantity of the 1 M hydrochloric acid added dropwise. This production was further repeated to produce toner particles 10 times in total, and the average values and standard deviations were calculated for all the items in the same manner as in Example 1.

As the result, since the pH was in the region where the dispersant hydroxylapatite began to be solubilized, the toner particles formed were unstable in particle diameter for each production, resulting in a broad particle size distribution and also showing low average values in respect of circularity, quantity of triboelectricity and transfer efficiency. Also, the standard deviations were great, showing inferior in stability and reproducibility in the production of toner particles.

Evaluation concerning the above Examples and Comparative Example was made in the following way.

(1) Evaluation of Reproducibility in Toner Particle Production

Toner particles were repeatedly produced 10 times in the same formulation and under the same conditions, and the particle size distribution breadth (D4/D1 ), quantity of triboelectricity, FPIA circularity and transfer efficiency were measured, and then their standard deviation SD values were determined and regarded as a parameter of reproducibility.

$$\text{Standard deviation } SD = \sqrt{\Sigma(a_1 - \bar{a}_1)^2 / (n-1)}$$

n=10 (10 batches under like conditions) $a_1$: Physical properties of toner (D4/D1, quantity of triboelectricity, circularity, transfer efficiency) $a\bar{a}_1$: Average values of the respective physical properties (D4/D1, quantity of triboelectricity, circularity, transfer efficiency) of toner particles repeatedly produced 10 times.

This parameter indicates that the smaller the numerical value is, the less the non-uniformity is in the particle size distribution breadth, quantity of triboelectricity, circularity and transfer efficiency, and the better the reproducibility in the toner production process is.

(2) Measurement of Transfer Efficiency of Toner Particles

To 100 parts of the toner particles produced in each Example and Comparative Example, 1 part of fine silica particles (BET specific surface area: 300 $m^2/g$) were added to prepare a developer. Using this developer, images were formed in normal environment by the use of CANON LASER SHOT LBP2030 (manufactured by CANON INC.) from which its fixing assembly was detached. Toner images (image density: 1.4) formed on its photosensitive drum are collected with a transparent pressure-sensitive adhesive tape, and their image density (D1 ) is measured with a Macbeth densitometer or a color reflection densitometer X-RITE 404A, manufactured by X-Rite Co.). Next, toner images are again formed on the photosensitive drum and then transferred onto a recording medium, where the toner images transferred onto the recording medium are collected with a transparent pressure-sensitive adhesive tape, and their image density (D2) is measured similarly. From the image densities (D1 ) and (D2), the transfer efficiency is calculated according to the following expression.

$$\text{Transfer efficiency } (\%) = (D2/D1) \times 100$$

(3) Evaluation Concerning Reaction Tank Contamination

Toner particles were repeatedly produced 10 times in the same formulation and under the same conditions. Whether or not the reaction tank was contaminated during this production was inspected visually, and evaluation was made according to the following criteria.

A: No problem in the production carried out 10 times repeatedly.

B: Substantially no problem in the production carried out 10 times repeatedly.

C: Gradually contaminated with repetition of the production

D: The reaction tank is contaminated on each occasion.

TABLE 1

| | pH at granu-lation | pH at acid treat-ment | n = 10 batch average values D4 (μm) | D4/D1 | Tribo-elec-tric-ity (μC/g) | FPIA circu-larity | Trans-fer effi-ciency (%) | n = 10 batch standard deviations D4/D1 | Tribo-elec-tric-ity (μC/g) | FPIA circu-larity | Trans-fer effi-ciency (%) | Reaction* tank contami-nation |
|---|---|---|---|---|---|---|---|---|---|---|---|---|
| Example: | | | | | | | | | | | | |
| 1 | 5.2 | 1.0 | 7.0 | 1.24 | −48.2 | 0.983 | 98 | 0.06 | 3.3 | 0.003 | 0.89 | A |
| 2 | 4.2 | 1.0 | 7.1 | 1.30 | −42.3 | 0.970 | 95 | 0.07 | 3.8 | 0.004 | 1.13 | A |
| 3 | 6.0 | 1.0 | 6.8 | 1.34 | −44.6 | 0.973 | 96 | 0.07 | 3.7 | 0.004 | 1.20 | B |
| 4 | 4.8 | 1.0 | 7.0 | 1.26 | −50.1 | 0.981 | 97 | 0.06 | 3.0 | 0.003 | 0.97 | A |
| Comparative Example: | | | | | | | | | | | | |
| 1 | 10.0 | 1.0 | 7.1 | 1.37 | −42.1 | 0.971 | 95 | 0.10 | 4.8 | 0.009 | 1.84 | D |
| 2 | 5.2 | 3.8 | 7.0 | 1.35 | −28.5 | 0.975 | 95 | 0.08 | 7.0 | 0.004 | 1.40 | A |
| Example: | | | | | | | | | | | | |
| 5 | 5.5 | 1.0 | 6.9 | 1.26 | −43.8 | 0.984 | 98 | 0.08 | 3.5 | 0.003 | 0.98 | A |
| 6 | 4.3 | 1.0 | 7.2 | 1.32 | −41.5 | 0.972 | 95 | 0.08 | 3.9 | 0.004 | 1.15 | A |
| Comparative Example: | | | | | | | | | | | | |
| 3 | 3.3 | 1.0 | 8.5 | 1.42 | −39.8 | 0.951 | 92 | 0.10 | 6.8 | 0.013 | 1.97 | C |
| Reference Example: | | | | | | | | | | | | |
| 1 | 6.8 | 1.0 | 7.0 | 1.35 | −44.1 | 0.958 | 94 | 0.06 | 3.8 | 0.004 | 1.35 | A |

*(visual inspection)

What is claimed is:

1. A process for producing a toner, comprising;

adjusting to from 4.0 to 6.0 pH of an aqueous medium containing a calcium phosphate, which is prepared by mixing an aqueous phosphate solution with an aqueous calcium salt solution;

dispersing in the aqueous medium a polymerizable monomer composition having at least a polymerizable monomer, a colorant, a polar polymer or polar copolymer having a carboxyl group, and a polymerization initiator to form particles of the polymerizable monomer composition;

polymerizing in the aqueous medium the polymerizable monomer contained in the particles, to form toner particles; and adjusting the pH of the aqueous medium to from 1.0 to 3.0 to dissolve the calcium phosphate, followed by separating the toner particles from the aqueous medium;

said toner particles having a circularity of from 0.970 to less than 1.000 as measured with a flow type particle image analyzer.

2. The process according to claim 1, wherein said aqueous medium is adjusted to the pH of from 4.0 to 6.0 by adding said aqueous calcium salt solution after a water-soluble inorganic acid is added dropwise to said aqueous phosphate solution.

3. The process according to claim 2, wherein said water-soluble inorganic acid is added dropwise in an amount of from 0.3 mol to 0.9 mol per mol of a phosphate in said aqueous phosphate solution when a monovalent water-soluble inorganic acid is used, is added dropwise in an amount of from 0.15 mol to 0.45 mol per mol of a phosphate in said aqueous phosphate solution when a divalent water-soluble inorganic acid is used, and is added dropwise in an amount of from 0.1 mol to 0.3 mol per mol of a phosphate in said aqueous phosphate solution when a trivalent water-soluble inorganic acid is used.

4. The process according to claim 2, wherein said water-soluble inorganic acid is one selected from the group consisting of hydrochloric acid, sulfuric acid, nitric acid and phosphoric acid.

5. The process according to claim 1, wherein said aqueous medium is adjusted to the pH of from 4.0 to 6.0 by adding a water-soluble inorganic acid dropwise after said aqueous phosphate solution and said aqueous calcium salt solution are mixed.

6. The process according to claim 5, wherein said water-soluble inorganic acid is added dropwise in an amount of from 0.3 mol to 0.9 mol per mol of a phosphate in said aqueous phosphate solution when a monovalent water-soluble inorganic acid is used, is added dropwise in an amount of from 0.15 mol to 0.45 mol per mol of a phosphate in said aqueous phosphate solution when a divalent water-soluble inorganic acid is used, and is added dropwise in an amount of from 0.1 mol to 0.3 mol per mol of a phosphate in said aqueous phosphate solution when a trivalent water-soluble inorganic acid is used.

7. The process according to claim 5, wherein said water-soluble inorganic acid is one acid selected from the group consisting of hydrochloric acid, sulfuric acid, nitric acid and phosphoric acid.

8. The process according to claim 1, wherein an aqueous solution having pH from 7 to 14 is obtained when said aqueous phosphate solution is mixed with said aqueous calcium salt solution.

9. The process according to claim 1, wherein an aqueous solution having pH from 9 to 14 is obtained when said aqueous phosphate solution is mixed with said aqueous calcium salt solution.

10. The process according to claim 1, wherein the pH of the aqueous medium containing the calcium phosphate before said polymerizable monomer composition is dispersed is adjusted to from 4.5 to 5.8.

11. The process according to claim 1, wherein said calcium phosphate is hydroxylapatite.

12. The process according to claim 1, wherein said polymerizable monomer comprises a monomer selected from the group consisting of a styrene monomer, an acrylate monomer and an methacrylate monomer.

13. The process according to claim 1, wherein said polar polymer or polar copolymer having a carboxyl group is a polar polymer or polar copolymer selected from the group consisting of i) a saturated polyester, ii) an unsaturated polyester, iii) a homopolymer comprising a monomer comprising an unsaturated carboxylic acid, an unsaturated dibasic acid or an unsaturated dibasic acid anhydride and iv) a copolymer of a monomer selected from the group consisting of an unsaturated carboxylic acid, an unsaturated dibasic acid and an unsaturated dibasic acid anhydride with a styrene monomer.

14. The process according to claim 1, wherein said polar polymer or polar copolymer having a carboxyl group is used in an amount of from 1 part by weight to 35 parts by weight based on 100 parts by weight of the polymerizable monomer.

15. The process according to claim 1, wherein said polar polymer or polar copolymer having a carboxyl group is used in an amount of from 5 parts by weight to 20 parts by weight based on 100 parts by weight of the polymerizable monomer.

16. The process according to claim 1, wherein said polar polymer or polar copolymer having a carboxyl group has an acid value of from 5 mg KOH/g to 50 mg KOH/g.

17. The process according to claim 1, wherein said polar polymer or polar copolymer having a carboxyl group has an acid value of from 10 mg KOH/g to 35 mg KOH/g.

18. The process according to claim 1, wherein said toner particles has a weight-average particle diameter of from 3 μm to 10 μm.

19. The process according to claim 1, wherein said toner particles has a weight-average particle diameter of from 4 μm to 9 μm.

* * * * *

UNITED STATES PATENT AND TRADEMARK OFFICE

CERTIFICATE OF CORRECTION

PATENT NO. : 6,054,244

DATED : April 25, 2000

INVENTOR(S) : KATO KAZUNORI ET AL.

It is certified that error appears in the above-identified patent and that said Letters Patent is hereby corrected as shown below:

COLUMN 1:

Line 23, "are" should read --are widely--;
Line 25, "the" should be deleted;
Line 32, "a process known as" should be deleted;
Line 43, "especially" should be deleted;
Line 44, "problem" should read --a particular problem in--;
Line 47, "when" should read --when actually--;
Line 48, "actually for the" should read --for--,
Line 63, "a" should read --a different--; and "in" should read --in the--;
Line 64, "to" should read --therein to--; and
Line 67, "depends" should read --depend--.

COLUMN 2:

Line 1, "in a large proportion, where" should read --to a large degree, wherein the--;
Line 2, "brings about" should read --provides--;
Line 30, "may hardly stand" should read --are barely attached--;
Line 31, "bare" should be deleted; and "particles" should read --particles,--
Line 34, "a-larger" should read --a larger--;
Line 36, "too, it does not especially come into question" should read --it is not an issue--;
Line 45, "sellled," should read --resolved--;

Line 50, "easy in technical view" should read --technically easy--;
Line 53, "complete" should read --complete a--;
Line 54, "not causative of any" should read --which does not cause--; and
Line 60, "process" should be deleted.

UNITED STATES PATENT AND TRADEMARK OFFICE

CERTIFICATE OF CORRECTION

PATENT NO. : 6,054,244

DATED : April 25, 2000

INVENTOR(S) : KATO KAZUNORI ET AL.

It is certified that error appears in the above-identified patent and that said Letters Patent is hereby corrected as shown below:

COLUMN 3:

Line 22, "such a disadvantage that" should read --a disadvantage such that--;
Line 24, "low-" should be deleted;
Line 25, "ering of" should read --reduction in--;
Line 26, "such an advantage that" should read --an advantage such that--;
Line 34, "are also made so as" should read --were also made--;
Line 35, "problems" should read --problems inherent in--; and "toner has." should read --toner.--
Line 36, "proposed is a" should read --there is proposed a--;
Line 53, "comes to have" should read --has--; and
Line 64, "making" should read --thus making--.

COLUMN 4:

Line 25, "problem" should read --problems--;
Line 27, "any" should read --no--;
Line 28, "not" should be deleted;
Line 44, "always" should be deleted;
Line 45, "may occur during" should read --occurs during the--;
Line 46, "having a" should read --wherein the process has--;
Line 47, "a" should read --a reproducible--;
Line 49, "can" should read --are stable and can--;
Line 50, "always stably and in a" should be deleted;
Line 51, "good reproducibility." should be deleted;
Line 53, "a" should read --a reproducible--;
Line 55, "formed, always stably and in a good reproducibility." should read --formed in a stable manner--;

UNITED STATES PATENT AND TRADEMARK OFFICE

CERTIFICATE OF CORRECTION

PATENT NO. : 6,054,244

DATED : April 25, 2000

INVENTOR(S) : KATO KAZUNORI ET AL.

It is certified that error appears in the above-identified patent and that said Letters Patent is hereby corrected as shown below:

Line 62, "high" should read --of high--;
Line 63, "in" should be deleted; and "free" should read --is free--; and
Line 65, "comprising;" should read --comprising:--.

COLUMN 5:

Line 47, "mutually which" should read --mutually. The polymerizable monomers--;
Line 48, "and" should read --and the dispersants are--;
Line 55, "be removed" should read --remove them--; and
Line 64, "lowering" should read --reduction--.

COLUMN 6:

Line 7, "only" should read --merely--; and
Line 26, "any" should be deleted.

COLUMN 8:

Line 64, "very less cause" should read --cause less--.

COLUMN 11:

Line 50, "N-N-divinylanline," should read --N-N-divinylaniline,--.

COLUMN 18:

Line 19, "shaked" should read --shaken--; and
Line 31, "minute," should read --minutes,--.

UNITED STATES PATENT AND TRADEMARK OFFICE
CERTIFICATE OF CORRECTION

PATENT NO. : 6,054,244

DATED : April 25, 2000

INVENTOR(S) : KATO KAZUNORI ET AL.

It is certified that error appears in the above-identified patent and that said Letters Patent is hereby corrected as shown below:

COLUMN 23:

Line 27, "w ere" should read --were--;
Line 55, "(D4/D1 )," should read --(D4/D1),--

COLUMN 24:

Line 9, "a$\bar{a}_1$:" should read --$\bar{a}_1$--; and
Line 28, "(D1 )" should read --(D1)--.

COLUMN 28

Line 11, "has" should read --have--; and
Line 15, "has" should read --have--.

Signed and Sealed this

Twenty-second Day of May, 2001

Attest:

Nicholas P. Godici

NICHOLAS P. GODICI

Attesting Officer

*Acting Director of the United States Patent and Trademark Office*